(12) United States Patent
Gretz

(10) Patent No.: US 7,304,240 B1
(45) Date of Patent: Dec. 4, 2007

(54) CABLE SUPPORT ASSEMBLY FOR MINIMIZING BEND RADIUS OF CABLES

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 11/471,151

(22) Filed: Jun. 20, 2006

(51) Int. Cl.
*H02G 3/04* (2006.01)

(52) U.S. Cl. .................. 174/72 A; 174/95; 174/96; 174/101; 174/68.3; 248/49; 52/220.1; 138/107

(58) Field of Classification Search ........... 174/73 A, 174/96, 97, 98, 101, 100, 68.3, 99 R, 70 C, 174/48, 95; 248/49; 138/107, 162; 52/220.1, 52/220.5, 718.04
See application file for complete search history.

(56) References Cited

U.S. PATENT DOCUMENTS

| | | | |
|---|---|---|---|
| 3,302,350 A * | 2/1967 | Donald et al. ............ 52/288.1 |
| 4,077,434 A | 3/1978 | Sieckert et al. |
| 4,857,670 A * | 8/1989 | Frank et al. ............... 174/68.3 |
| 5,523,529 A * | 6/1996 | Holliday .................... 174/101 |
| 5,709,249 A | 1/1998 | Okada et al. |
| 6,399,883 B1 | 6/2002 | Lhota |
| 6,521,835 B1 | 2/2003 | Walsh |
| 6,903,275 B1 | 6/2005 | Jetton |

* cited by examiner

*Primary Examiner*—Dhiru R. Patel

(57) ABSTRACT

A cable support assembly for routing electrical, communication, or data cables throughout a building. The cable support assembly includes cable trays and brackets for securing the cable trays to an overhead structure. Tray couplers are provided for coupling trays together. The brackets include a base member and a hinge arm pivotally attached to the base member. The brackets are first secured to the overhead structure to establish a desired path for the cables. The hinge arms on the installed brackets are pivoted downwards and a cable tray section inserted therein. The hinge arms and cable tray sections may be rotated upwards and latched to the base members to lock the cable trays in place. Adjacent cable trays may be joined with couplers to create a cable support assembly in which the cable tray provides support for any electrical, communication, or data cables installed therein.

18 Claims, 10 Drawing Sheets

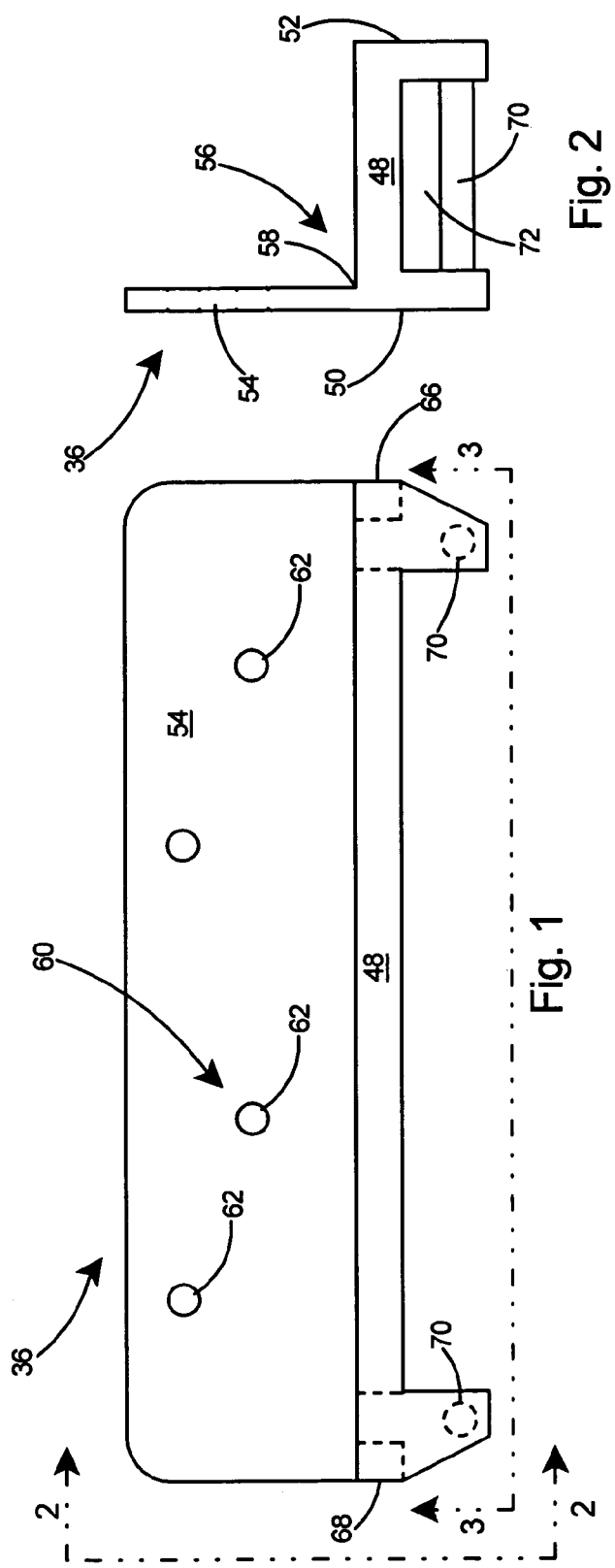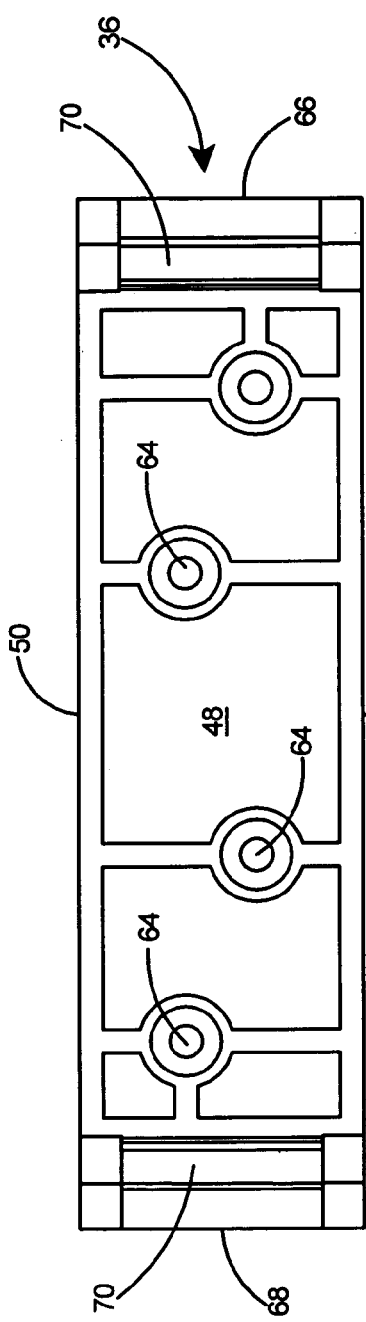

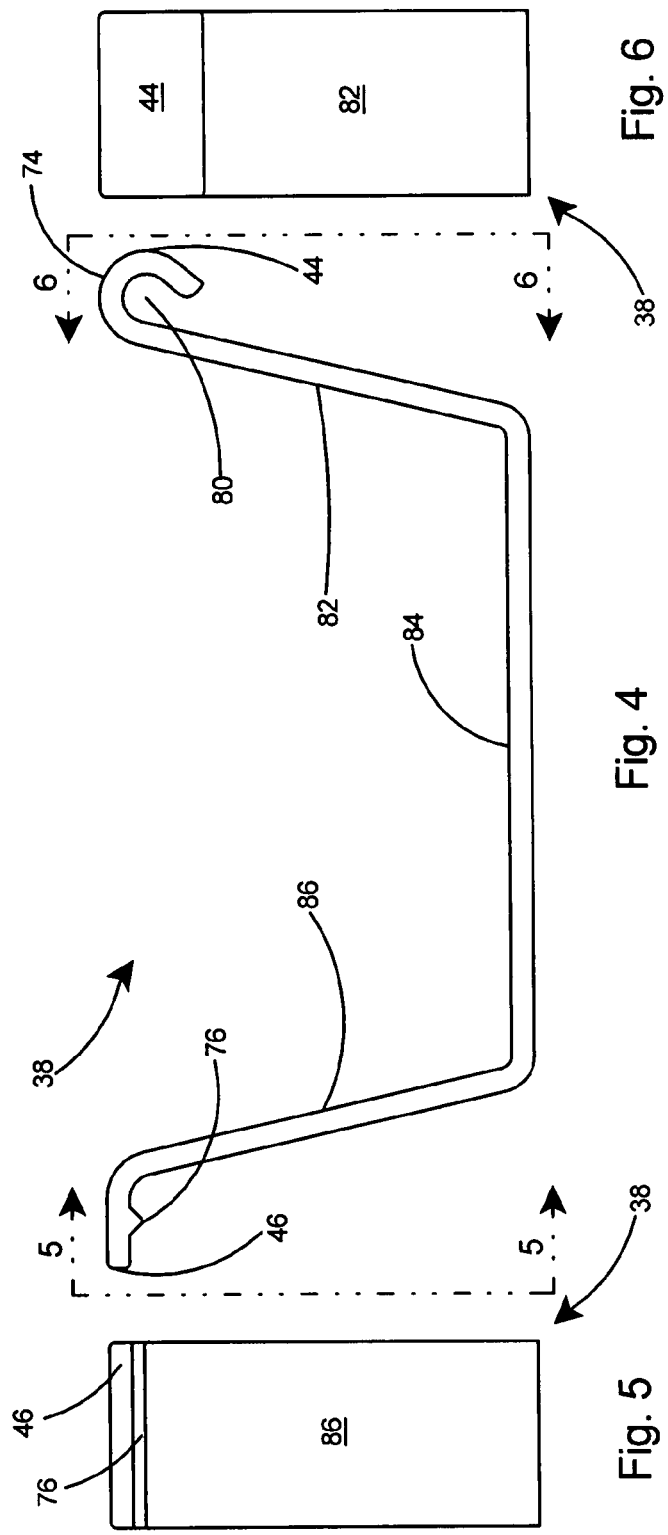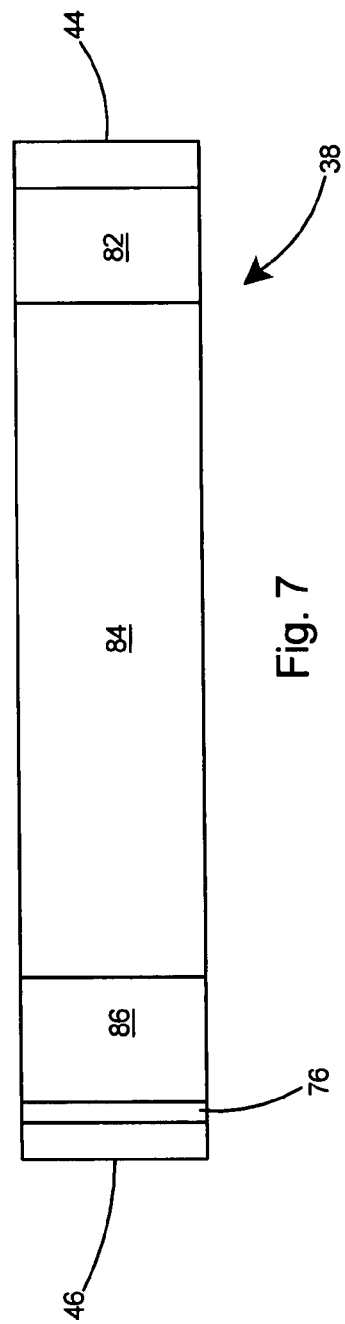

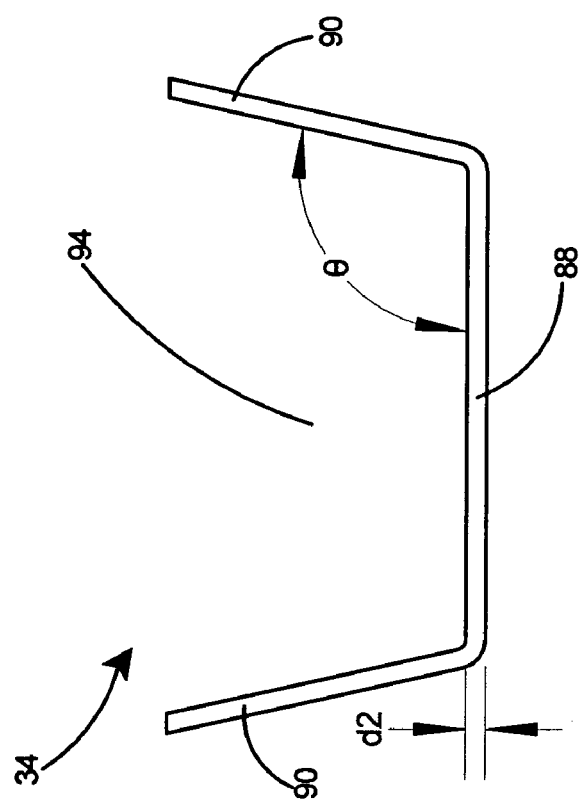
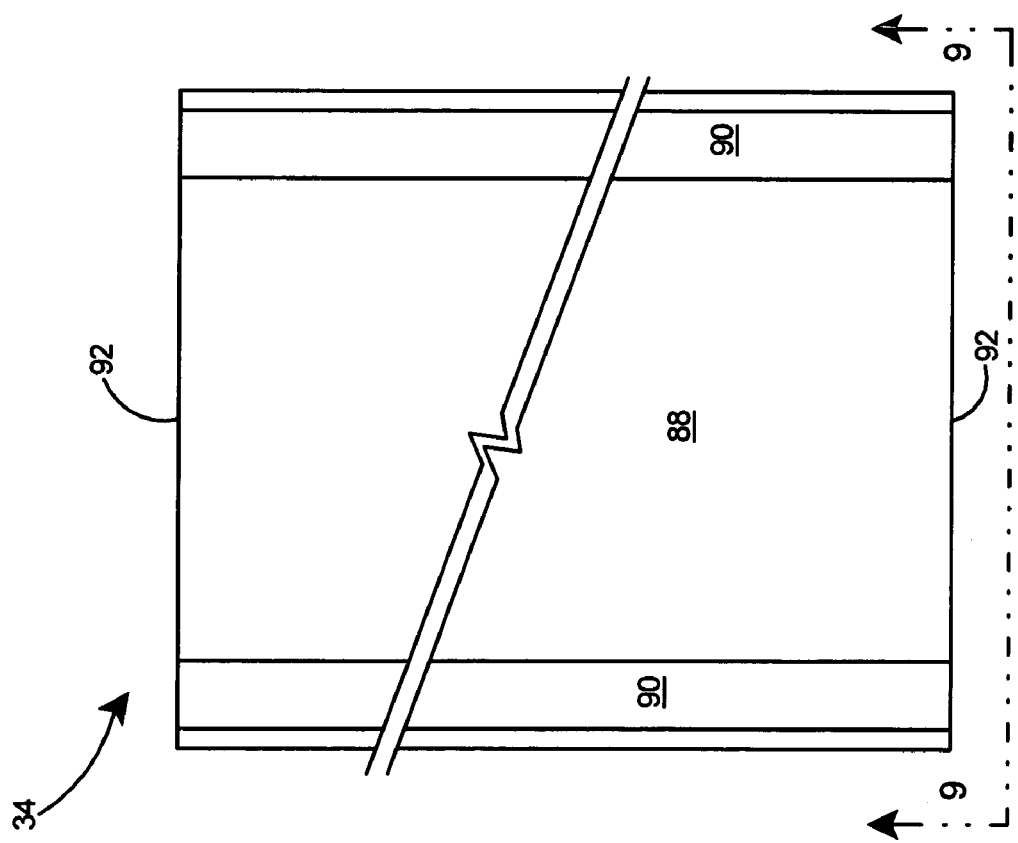

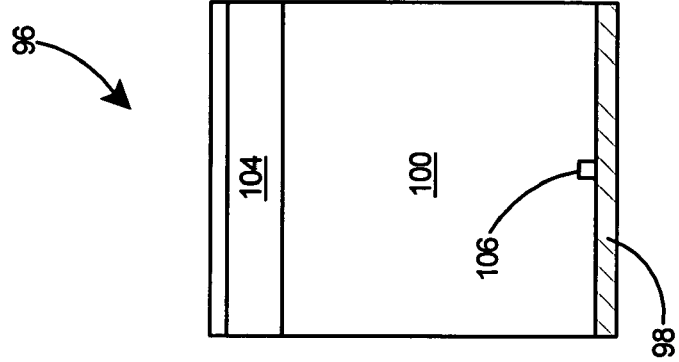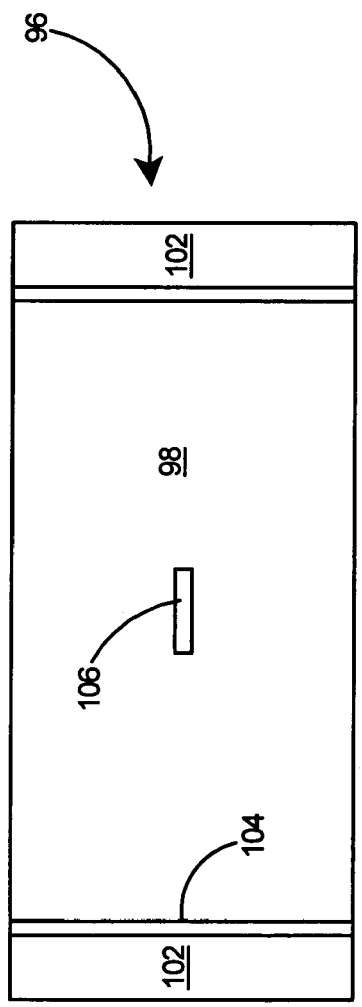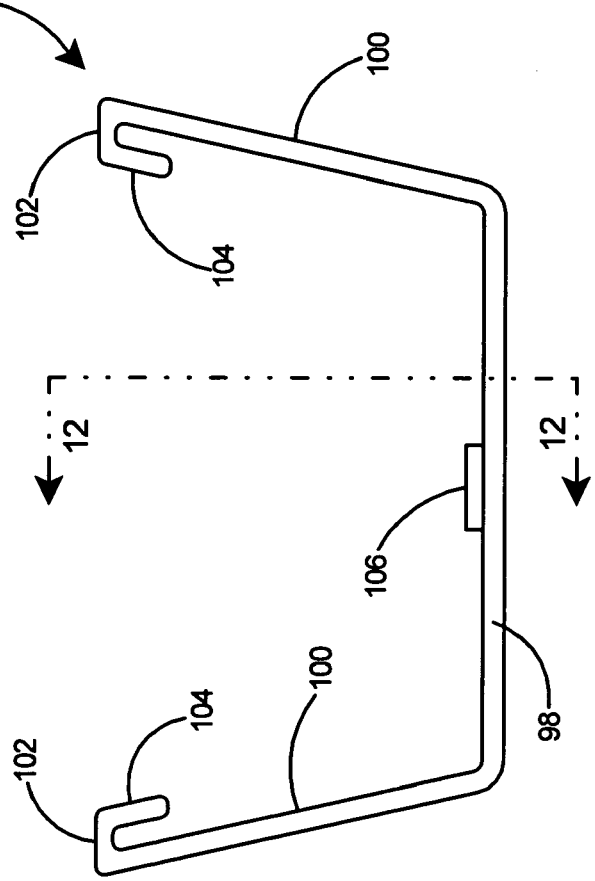

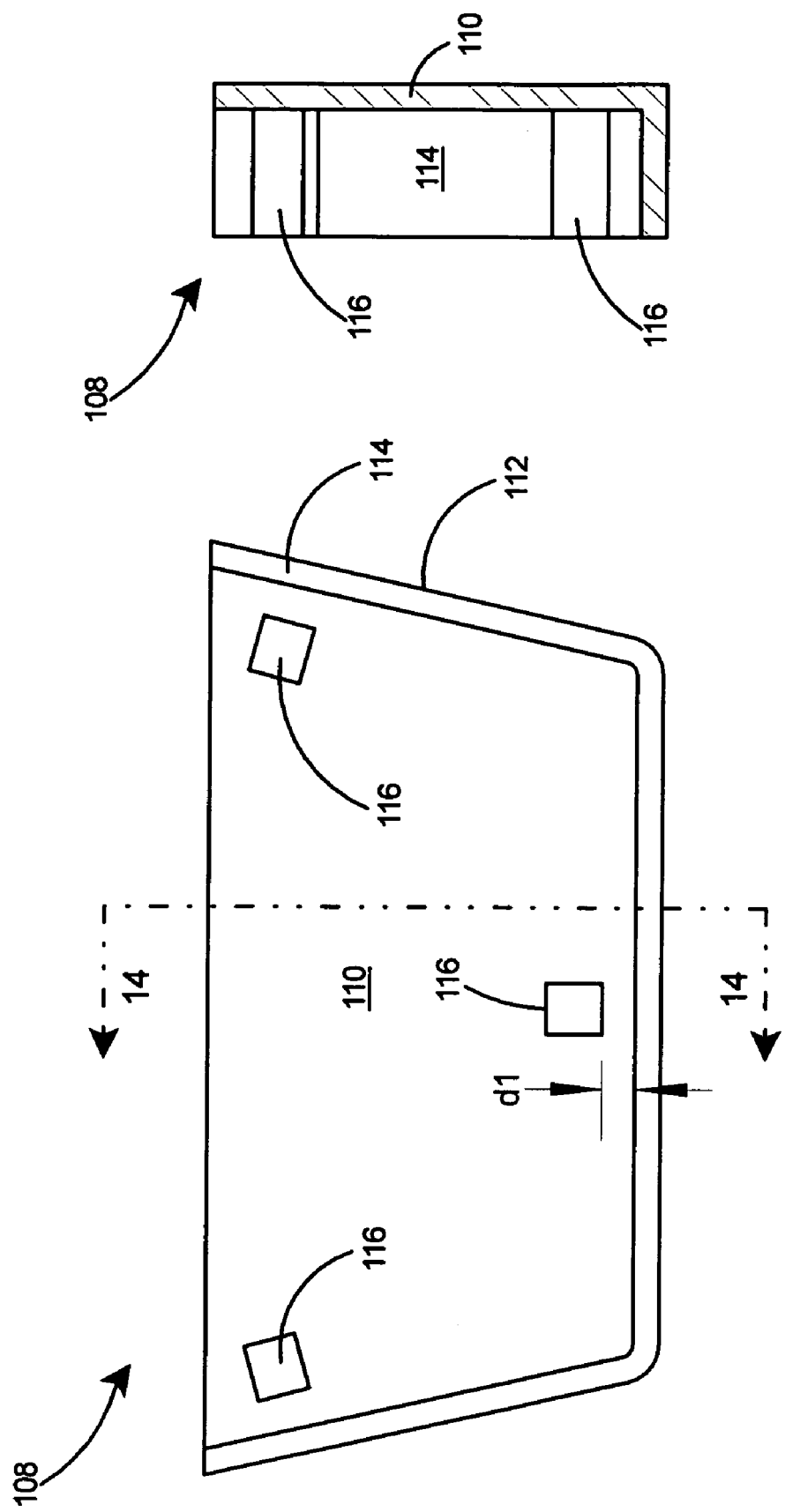

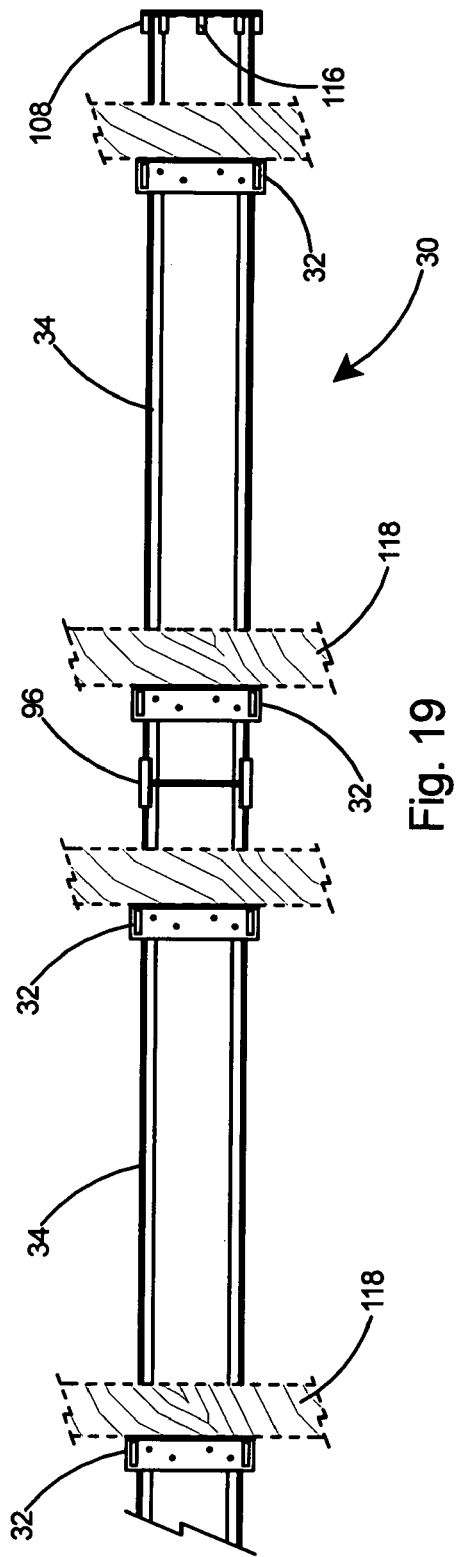
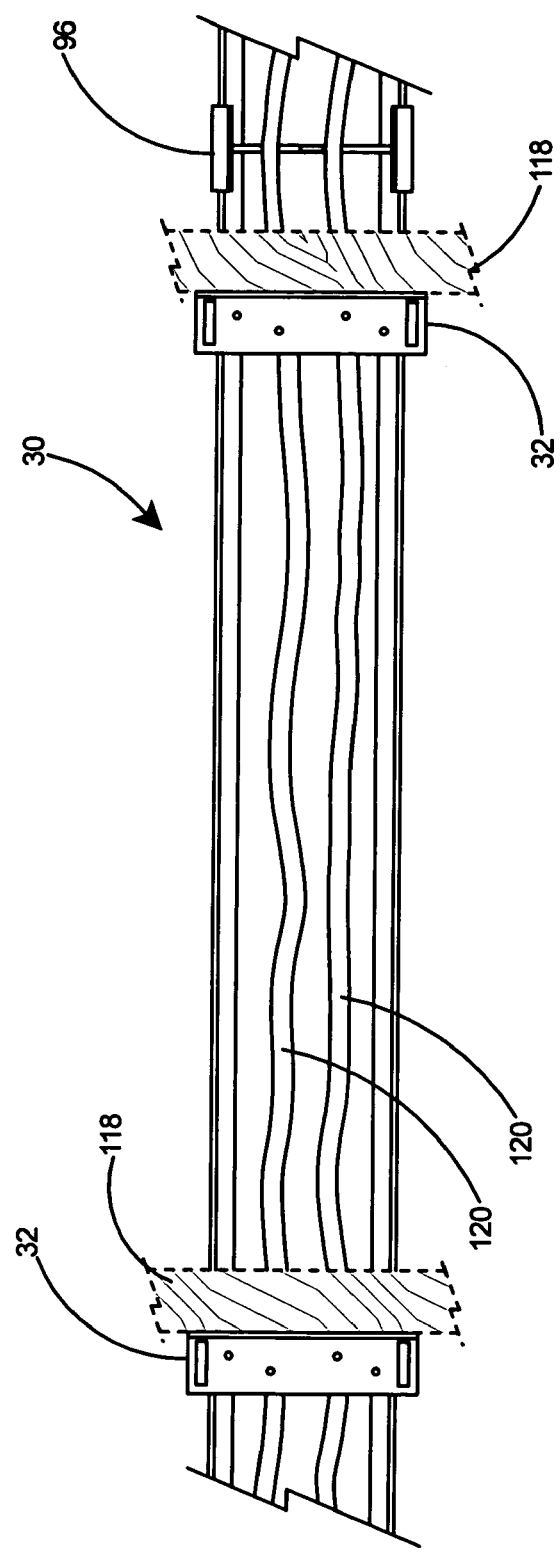
Fig. 19
Fig. 20

CABLE SUPPORT ASSEMBLY FOR MINIMIZING BEND RADIUS OF CABLES

FIELD OF THE INVENTION

This invention relates to cable supports and specifically to a cable support assembly or cable raceway that supports electrical cables in such a manner that the bend radius of individual cables is minimized.

BACKGROUND OF THE INVENTION

The installation of electrical cables in buildings is typically accomplished by drilling holes in wooden support elements such as joists or studs or using existing holes in metal support elements and routing the cables through the holes. Routing electrical cables in this manner causes each cable to be supported by the narrow thickness of the support element and will lead to sagging of cables in the open spaces between the support elements. Unfortunately, for the installation of low voltage cables such as communication or database cables, sagging can disturb the conductors within the cables. Bending and twisting of conductors can adversely affect the data transmission rate, which becomes very critical in cables having higher transmission rates, such as Category 5 telecommunications cables.

Various methods proposed for the support of low voltage electrical cables include the use of hangers for supporting the cables and cable pans or raceways.

What is needed is a simple cable support assembly in which the cable tray provides the support for the installed cables. The cable support assembly should also allow easy lowering of the cable tray, when desired, to facilitate inspection, repair, or installation of additional cables.

SUMMARY OF THE INVENTION

The invention is a cable support assembly for routing electrical, communication, or data cables throughout a building. The cable support assembly includes cable trays and brackets for securing the cable trays to an overhead structure. Tray couplers are provided for coupling tray sections together. The brackets include a base member and a hinge arm pivotally attached to the base member. The brackets are first secured to the overhead structure to establish a desired path for the cables. The hinge arms on the installed brackets are then pivoted downwards and a cable tray inserted therein. The hinge arms and cable trays are then rotated upwards and latched to the base members to lock the cable tray sections in place. The cables are then placed on the cable trays. Adjacent cable trays are joined with couplers to create a cable support assembly in which the cable tray provides support for any electrical, communication, or data cables installed therein.

OBJECTS AND ADVANTAGES

Several advantages are achieved with the cable support assembly of the present invention, including:
  (1) The hanger brackets of the cable support assembly are located exterior of the cable tray, thereby ensuring that the cables or cable bundles are supported by the cable tray and not by the hangers, thereby eliminating any possibility of cable sag which could be detrimental to the data transfer capabilities of the installed cables.
  (2) The cable brackets of the present invention enable easy pivoting insertion of the cable tray prior after the brackets have been secured to the building structure.
  (3) The cable brackets include a latching mechanism that enable the cable tray sections to be securely latched into position after brackets are aligned and installed.
  (4) The latching mechanism facilitates easy release of the cable tray sections for inspection or repair of existing cables or easy installation of additional cables.
  (5) The latching mechanism enables lowering of one side of the cable tray when released. As a result the cable tray sections continue to support the cables in the lowered position. This provides enhanced protection of the cables or cable bundles over prior art cable trays in which the cable trays must be snapped off or completely removed and leave the cables supported only by the hangers.

These and other objects and advantages of the present invention will be better understood by reading the following description along with reference to the drawings.

DESCRIPTION OF THE DRAWINGS

FIG. 1 is a front elevation view of the preferred embodiment of a base member portion of a bracket according to the present invention.

FIG. 2 is a side view of the base member taken along line 2-2 of FIG. 1.

FIG. 3 is a bottom view of the base member taken along line 3-3 of FIG. 1.

FIG. 4 is a front elevation view of the preferred embodiment of a hinge arm portion of a bracket according to the present invention.

FIG. 5 is a side view of the hinge arm taken along line 5-5 of FIG. 4.

FIG. 6 is a side view of the hinge arm taken along line 6-6 of FIG. 4.

FIG. 7 is a bottom view of the hinge arm of FIG. 6.

FIG. 8 is a top view of the preferred embodiment of a cable tray according to the present invention.

FIG. 9 is an end view of the cable tray taken along line 9-9 of FIG. 8.

FIG. 10 is a front elevation view of the preferred embodiment of a coupler according to the present invention.

FIG. 11 is a top view of the coupler taken along line 11-11 of FIG. 10.

FIG. 12 is a sectional view of the coupler taken along line 12-12 of FIG. 10.

FIG. 13 is a plan view of the preferred embodiment of an end cap according to the present invention.

FIG. 14 is a sectional view of the end cap taken along line 14-14 of FIG. 13.

FIG. 19 is a top view of a portion of a cable support assembly according to the present invention.

FIG. 20 is top view of a portion of a cable support assembly with electrical cables inserted within the cable tray.

Figure 15:
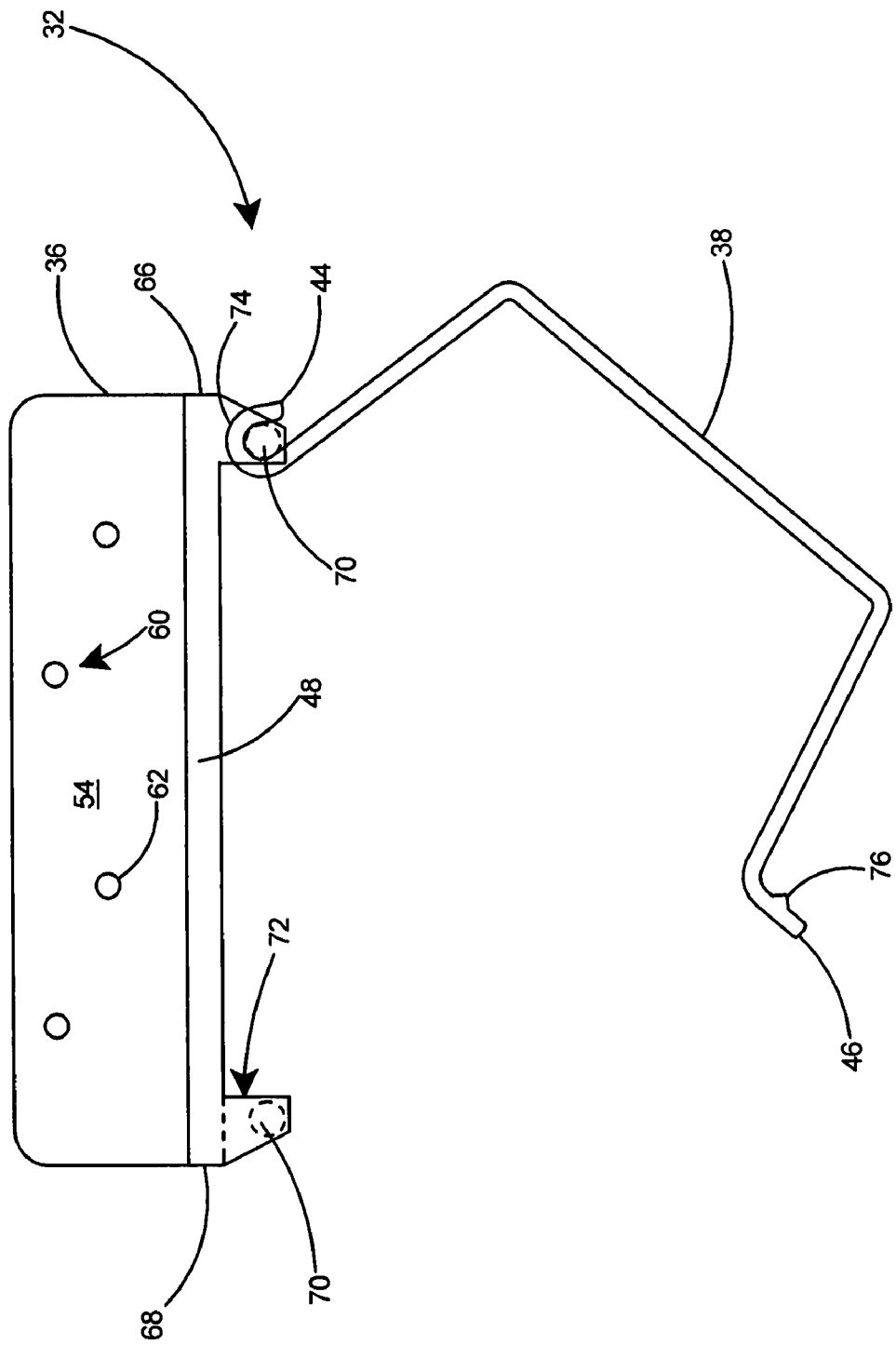
FIG. 15 is a front elevation view of the preferred embodiment of a latch bracket assembly according to the present invention with the hinge arm pivoted to an open position.

INDEX TO REFERENCE NUMERALS IN DRAWINGS 30 cable support assembly
32 bracket
34 cable tray
36 base member
38 hinge arm
40 building structure
42 fastener
44 first end of hinge arm
46 second end of hinge arm
48 horizontal support member
50 first side of horizontal support member
52 second side of horizontal support member
54 integral flange member
56 seat
58 juncture of horizontal support member and flange
60 attachment arrangement
62 aperture in flange
64 aperture in horizontal support member
66 first end of base member
68 second end of base member
70 circular pin
72 lateral slot
74 hook
76 tab
80 slot on hinge arm
82 first leg of hinge arm
84 second leg of hinge arm
86 third leg of hinge arm
88 bottom wall of cable tray
90 sidewall of cable tray
92 end of cable tray
94 interior channel
96 coupler
98 bottom wall of coupler
100 sidewall of coupler
102 top lip
104 inner lip
106 separator tab
108 end cap
110 end wall
112 outer edge
114 peripheral wall
116 post
118 joist
120 communications cable
$d_1$ distance between post and peripheral wall of end cap
$d_2$ thickness of bottom wall and sidewall of cable tray
$\theta$ angle of cable tray sidewalls with respect to bottom wall

DETAILED DESCRIPTION OF THE INVENTION

Figure 16:
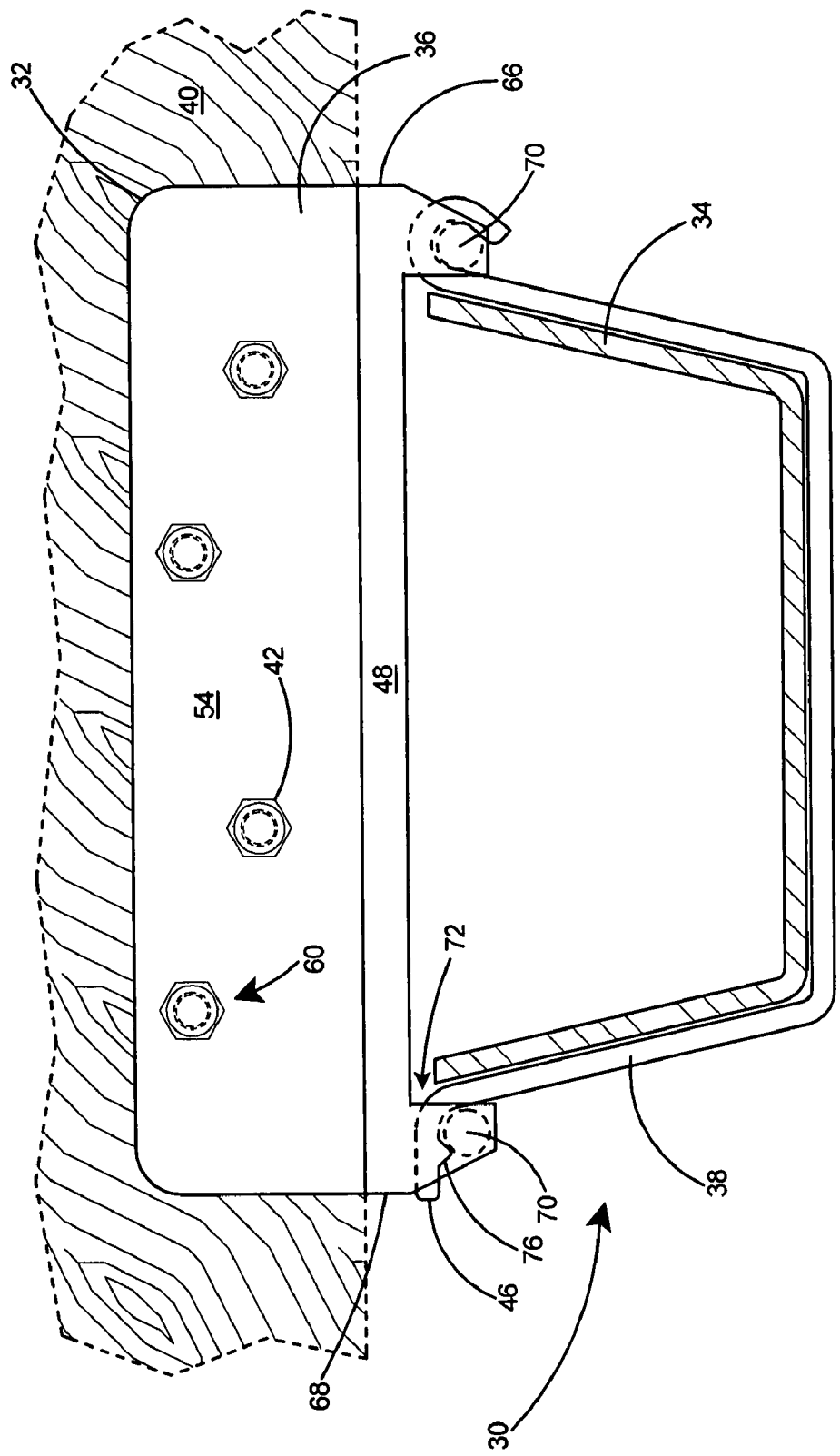
FIG. 16 is an end view of the latch bracket assembly of FIG. 15 with a cable tray inserted in the latch bracket and the hinge arm pivoted upwards and latched to the base member portion of the latch bracket.

With reference to FIG. 16 there is shown a preferred embodiment of a cable support assembly 30, which includes a bracket 32 and an elongated cable tray 34. The bracket 32 includes a base member 36 and a hinge arm 38. The bracket 32 is shown in FIG. 16 secured to a building structure 40 by fasteners 42.

As shown in FIG. 15, the hinge arm 38 is pivotally attached at a first end 44 to the base member 36. The hinge arm 38 further includes a second end 46 adapted to latch to the base member 36.

Referring to FIGS. 1-3, the base member 36 includes a horizontal support member 48 having a first 50 and second side 52. An integral flange member 54 extends upwardly from the first side 50 of the horizontal support member 48. A seat 56 is defined by the juncture 58 of the horizontal support member 48 and the integral flange 54. The base member 36 includes an attachment arrangement 60 for securing the bracket to a building structure (not shown). The attachment arrangement 60 includes apertures 62 in the flange 54 and fasteners 42 (see FIG. 16) associated with one or more of the apertures. The attachment arrangement 60 further includes apertures 64 in the horizontal support member 48 through which fasteners (not shown) can be driven to secure the base member 36 to a building structure. If preferred, the base member 36 may be placed against a support with the seat 56 fit flush against a rafter or joist, in which case fasteners can be driven into the rafter or joist though both the flange 54 and the horizontal support member 48 for added strength. The base member 36 includes two ends 66, 68 and a circular pin 70 supported at each of the ends 66, 68. The circular pin 70 at the second end 68 of the base member 36 defines a lateral slot 72 between the circular pin 70 and the horizontal support member 48.

With reference to FIGS. 5-7, the first end 44 of the hinge arm 38 includes a bent over portion or hook 74 forming a slot 80 therein and the second end 46 includes a tab 76 extending from the body of the hinge arm 38. The hinge arm 38 further includes a first leg 82 extending downward from the first end 44, a second leg 84 extending horizontally from the first leg 82, and a third leg 86 extending upward from the second leg 84.

As shown in FIG. 15, the tab 76 is capable of engaging the circular pin 70 at the second end 68 of the base member 36 when pushed into the lateral slot 72. Pushing the second end 46 of the hinge arm 38 into the lateral slot 72 locks the second end 46 of the hinge arm 38 to the base member 36. The hook 74 of the hinge arm 38 is snapped over the circular pin 70 at the first end 66 of the base member 36 after which the hinge arm 38 will pivot about the circular pin 70.

Referring to FIGS. 8-9, the elongated cable tray 34 includes a bottom wall 88, two sidewalls 90, and two ends 92. The sidewalls 90 are preferably at an angle $\theta$ of between 95 and 110 degrees with respect to the bottom wall 88. The bottom wall 88 and sidewalls 90 of the cable tray 34 define an interior channel 94 capable of receiving and supporting therein electrical, communication, or data cables or cable bundles (not shown). The cable tray 34 is provided in lengths, as measured between the two ends 92, preferably between 4 and 15 feet.

With reference to FIGS. 10-12, the cable support assembly includes a coupler 96 for connecting two of the cable trays together. The coupler 96 includes a bottom wall 98, two sidewalls 100, top lip 102 extending inwardly from the sidewalls 100, and an inner lip 104 extending downward from the top lip 102. A separator tab 106 extends upward from the bottom wall 98 of the coupler 96. The separator tab 106 will function to limit the distance a cable tray may be inserted in the coupler 96.

Referring to FIGS. 13-14, the cable support assembly of the present invention includes an end cap 108 for closing the open end of the cable tray. The end cap 108 includes an end wall 110 having an outer edge 112 and a peripheral wall 114 extending orthogonally from the outer edge 112. One or more posts 116 extend orthogonally from the end wall 110 proximate the peripheral wall 114. The posts 116 extend as far as does the peripheral wall 114 from the end wall 110.

The bracket 32 is preferably provided in one piece, as shown in FIG. 15, with the hinge arm 38 pivotally attached to the base member 36. To operate the current invention, brackets 32 are secured to an overhead building structure 40 such as a joist or rafter (see FIG. 16). At least two brackets 32 are secured to the overhead structure to support each cable tray section 34. Each bracket is secured to the building structure using the attachment arrangement 60, including fasteners 42 driven through flange 54 or through horizontal support member 48 and into the building structure 40. Once the brackets 32 are mounted to the building structure 40 as shown in FIG. 16, the hinge arm 38 of each bracket is pivoted to the down position as shown in FIG. 15. With the hinge arms 38 rotated to the down position, a cable tray (not shown) is then placed within the open hinge arms 38. The hinge arms 38 and cable tray are then rotated upwards and the second end 46 of the hinge arm 38 including the tab 76 latched to the base member 36 portion of the bracket 32 as shown in FIG. 16. Latching the hinge arm 38 to the base member 36 would typically require an installer to first press the second end 46 of the hinge arm 38 inward to slightly compress the cable tray 34. The installation would be completed by pressing the second end 46 of the hinge arm 38 outward until the second end 46 of the hinge arm 38 latches to the base member 36.

Figure 17:
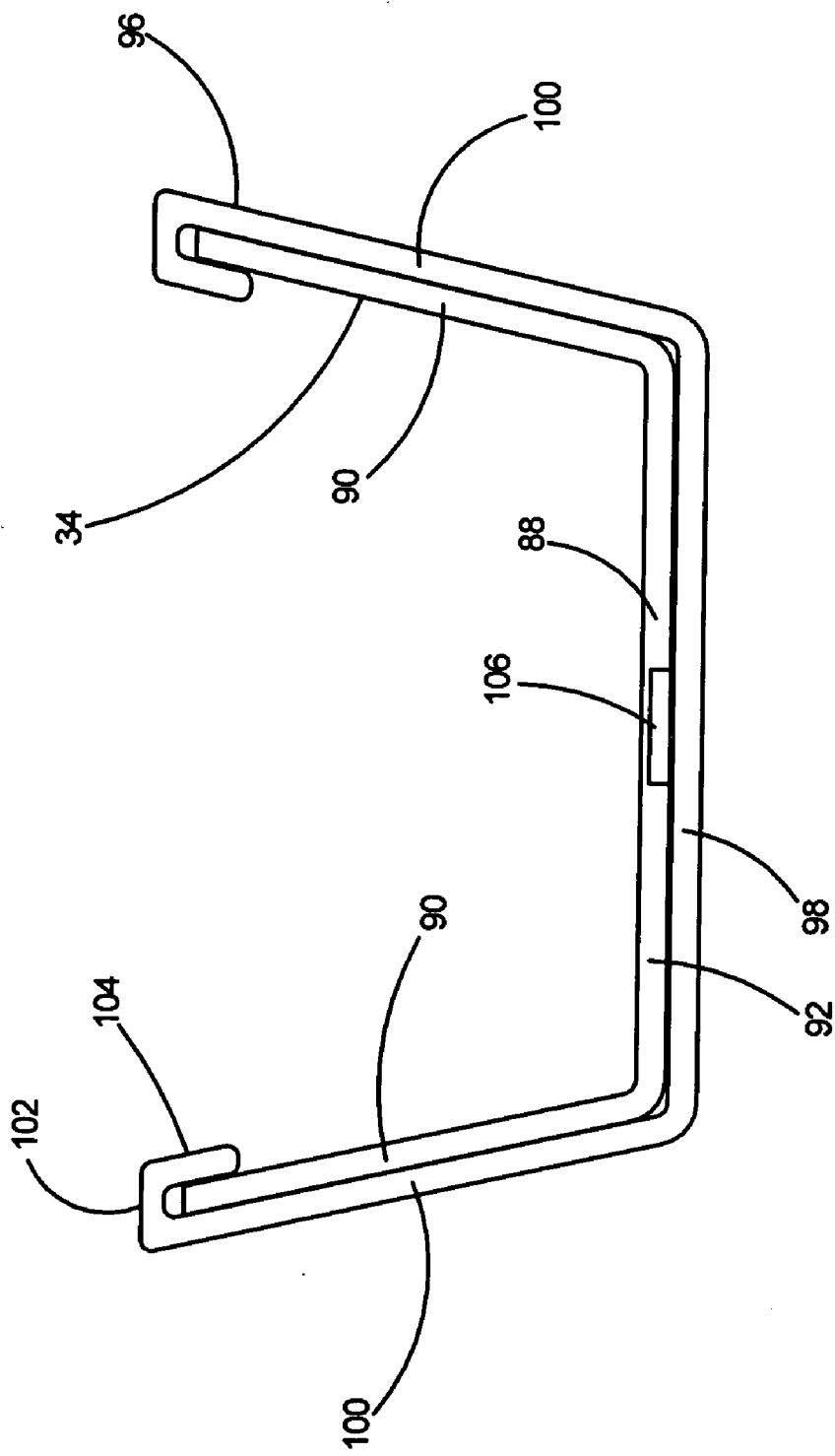
FIG. 17 is an end view of a coupling secured to a cable tray according to the present invention.

As shown in FIG. 17, a coupler 96 is used for securing together two cable trays at their ends. The coupler 96 shown in FIG. 17 has been slid upon the end 92 of a cable tray 34. The bottom wall 98 and two sidewalls 100 of the coupler 96 are of a slightly larger dimension than the bottom wall 88 and sidewalls 90 of the cable tray 34 and an end 92 of a cable tray 34 will therefore nest within the coupler 96 and be frictionally held thereto. Two cable trays 34 may therefore be connected together by sliding an end 92 of each cable tray 34 into one of the couplers 96. Top lip 102 and inner lip 104 of coupler 96 hold cable tray 34 therein and prevent it from sliding out of the coupler 96 and also limit vertical and horizontal movement of the cable tray 34 with respect to the coupler 96. Coupling the two ends of the cable trays in this manner maintains the bottom walls of the two separate cable trays substantially even and therefore causes no bending or sagging of cables or cable bundles (not shown) when they are laid therein.

Figure 18:
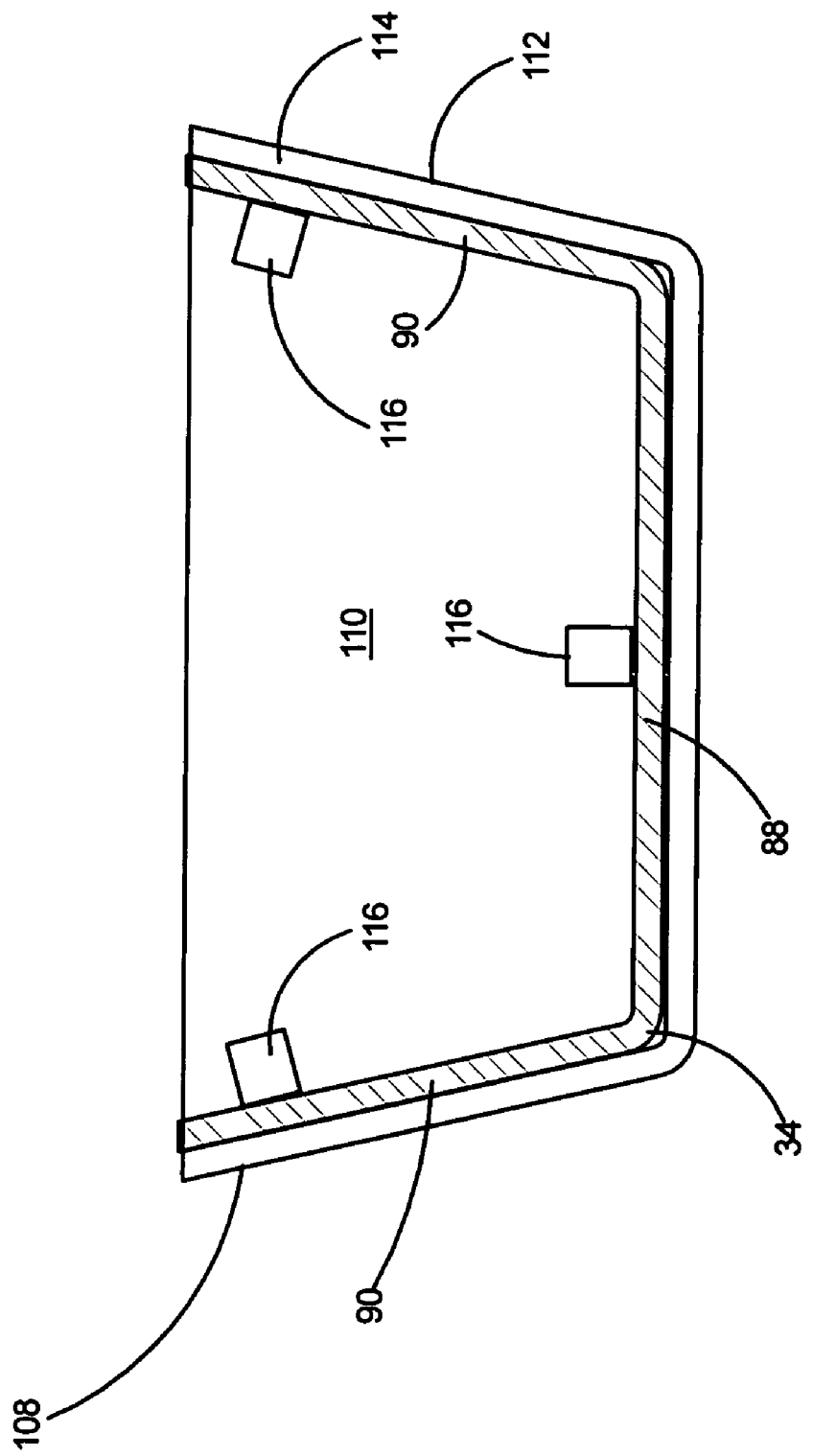
FIG. 18 is a sectional view of the end cap of FIG. 13 secured to the cable tray of FIG. 9.

With reference to FIG. 18, an end cap 108 may be used to terminate a cable tray 34. The end cap 108 is simply slid onto an end of the cable tray 34. The cable tray 34 is typically molded or extruded of plastic with the bottom wall 88 and the sidewalls 90 of the cable tray 34 of a given thickness. The end cap 108 is configured such that the distance between the post 116 and the peripheral wall 114 (see distance $d_1$ in FIG. 13) are no more than 0.010 inch larger than the thickness (see thickness $d_2$ in FIG. 9) of the bottom wall 88 and sidewalls 90 of the cable tray 34. Sliding the end cap 108 onto the cable tray 34 therefore enables a frictional fit of the end cap 108 to the cable tray 34 with the cable tray 34 frictionally held between the posts 116 and peripheral wall 114 of the end cap 108.

Although they could be constructed of metal or other materials, it is preferred that the components of the cable support assembly 30 of the present invention, including the base member, the hinge arm, the end cap, the coupler, and the elongated cable tray are each formed in one piece of plastic. The base member, the hinge arm, the end cap, and the coupler are preferably molded of plastic and the cable tray can be molded or extruded of plastic.

With reference to FIG. 19, the top view of a portion of a cable support assembly 30 is shown according to the present invention. The cable support assembly 30 includes cable trays 34, brackets 32 secured to joists 118, a coupler 96 securing together two cable trays 34, and an end cap 108 capping one end of a cable tray. FIG. 20 depicts a close up view of the left hand portion of FIG. 19 and with communications cables 120 laid therein and supported by the bottom wall 88 of the cable tray 34. The advantage of the cable support assembly 30 of the present invention is that the cables 120 are supported by the cable tray 34 and not by the hangers or brackets 32. There is no chance of the delicate communication cables 120 sagging or bending as a result of being supported primarily by the hangers or brackets, as in prior art cable support systems.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. A cable support assembly comprising:
    a bracket including a base member and a hinge arm;
    said hinge arm pivotally attached at a first end to said base member;
    an attachment arrangement associated with said base member for securing said bracket to a building structure;
    said hinge arm including a second end adapted to latch to said base member;
    a circular pin on said base member, said circular pin defining a lateral slot between said circular pin and said base member;
    said hinge arm includes said second end having a tab extending therefrom;
    said tab capable of engaging and locking said second end of said hinge arm to said base member when pushed into said lateral slot;
    an elongated cable tray for carrying cables adapted to be received within said hinge arm; and
    said cable tray including an interior channel for receiving and supporting therein electrical, communication, or data cables.

2. The cable support assembly of claim 1 wherein said hinge arm includes
    a first leg extending downward from said first end of said hinge arm;
    a second leg extending horizontally from said first leg; and
    a third leg extending upward from said second leg.

3. The cable support assembly of claim 1 wherein said base member of said bracket includes
    a horizontal support member including two sides;
    an integral flange member extending upwardly from a first of said sides of said horizontal support member; and
    a seat defined by the juncture of said horizontal support member and said integral flange member.

4. The cable support assembly of claim 3 wherein said attachment arrangement includes apertures in said flange member and fasteners associated with one or more of said apertures.

5. The cable support assembly of claim 3 wherein said attachment arrangement includes apertures in said horizontal support member and fasteners associated with one or more of said apertures.

6. The cable support assembly of claim 3 wherein
    said base member includes a second circular pin;
    said first end of said hinge arm includes a bent over portion; and said bent over portion of said first end of said hinge arm pivotally engaged around said second circular pin.

7. The cable support assembly of claim 1 wherein
said cable tray includes a bottom wall and two sidewalls; and
said sidewalls are at an angle of between 95 and 110 degrees with respect to said bottom wall.

8. The cable support assembly of claim 1 including
ends on said cable tray; and
a coupler for connecting two of said cable trays together at said ends.

9. The cable support assembly of claim 8 including
a bottom wall and two sidewalls on said coupler;
a top lip extending inwardly from said sidewalls of said coupler; and
an inner lip extending downward from said top lip of said coupler.

10. The cable support assembly of claim 9 wherein
said bottom wall and two sidewalls of said coupler of a slightly larger dimension than said bottom wall and sidewalls of said cable tray; and
two of said cable trays may be connected together by sliding an end of each of said cable trays into one of said couplers.

11. The cable support assembly of claim 10 including
a separator tab extending upwards from said bottom wall of said coupler;
said separator tab limiting the distance a cable tray may be inserted in said coupler.

12. The cable support assembly of claim 1 including an end cap for closing the open end of said cable tray.

13. The cable support assembly of claim 12 wherein
said end cap includes an end wall having an outer edge;
a peripheral wall extending orthogonally from the outer edge of said end wall; and
one or more posts extending orthogonally from said end wall proximate said peripheral wall,
whereby sliding of said end cap onto an end of said cable tray enables a frictional fit of said end cap to said cable tray.

14. The cable support assembly of claim 13 wherein
said bottom wall and said sidewalls of said cable tray include a thickness; and
the distance between said post and said peripheral wall of the end cap are no more than 0.010 inch larger than the thickness of said bottom wall and sidewalls of said cable tray.

15. The cable support assembly of claim 1 wherein said base member, said hinge arm, and said elongated cable tray are each formed in one piece of plastic.

16. A cable support assembly comprising:
a bracket including a base member and a hinge arm;
said base member including two ends and a circular pin supported at each of said ends;
said hinge arm pivotally attached to one of said circular pins of said base member;
an attachment arrangement associated with said base member for securing said bracket to a building structure;
said hinge arm including a second end adapted to latch to said base member;
a lateral slot between the other of said circular pins and said base member;
said hinge arm includes said second end having a tab extending therefrom;
said tab capable of engaging and locking said second end of said hinge arm to said base member when pushed into said lateral slot;
an elongated cable tray for carrying cables adapted to be received within said hinge arm; and
said cable tray including an interior channel for receiving and supporting therein electrical, communication, or data cables.

17. A method of supporting cables from a building structure including the steps of:
(a) providing a bracket including a base member and a hinge arm, said hinge arm pivotally attached at a first end to said base member, said hinge arm including a second end adapted to latch to said base member, said base member including an attachment arrangement for securing said bracket to a building structure;
(b) providing an elongated cable tray for carrying cables adapted to be received within said hinge arm, said cable tray including an interior channel for receiving and supporting therein electrical, communication, or data cables;
(c) securing two of said brackets to the building structure using said attachment arrangement, each of said brackets aligned linearly on the building structure;
(d) rotating said hinge arm downward from said base member on each of said secured brackets;
(e) placing a first of said cable trays within said hinge arms of each of said secured brackets;
(f) rotating said hinge arms and said first cable tray upwards;
(g) pressing said second end of said hinge arm inward to slightly compress said first cable tray;
(h) pressing said second end of said hinge arm outward until said second end of said hinge arm latches to said base member;
(i) providing a coupling member for securing together two of said cable trays;
(j) repeating steps (a) through (h) above for a second cable tray in linear alignment with said first cable tray;
(k) sliding a first end of said coupling member onto an end of said first cable tray;
(l) sliding said second cable tray into a second end of said coupling member;
(m) repeating steps (j) through (l) as needed until a desired length of supported cable tray is reached; and
(n) laying cables within said cable trays.

18. The cable support assembly of claim 17 wherein said attachment arrangement includes apertures in said flange member and fasteners associated with one or more of said apertures.

* * * * *